United States Patent [19]

Chen et al.

[11] Patent Number: 5,428,192
[45] Date of Patent: Jun. 27, 1995

[54] METHOD AND APPARATUS FOR FINDING THE LOCATION OF A POINTING INSTRUMENT ON A TABLET

[75] Inventors: Chien-Hung Chen; Jung-Chih Hsu, both of Hsin-Tien, Taiwan

[73] Assignee: Ace Cad Enterprise Co., Ltd., Hsin-Tien, Taiwan

[21] Appl. No.: 60,013

[22] Filed: May 10, 1993

[51] Int. Cl.6 ............................................. G08C 21/00
[52] U.S. Cl. ..................................... 178/19; 178/18; 178/20; 345/179
[58] Field of Search ....................... 178/18, 19, 20, 87; 345/179

[56] References Cited

U.S. PATENT DOCUMENTS

| | | | |
|---|---|---|---|
| 4,054,746 | 10/1977 | Kamm | 178/19 |
| 4,088,842 | 5/1978 | Ikedo | 178/19 |
| 4,210,775 | 7/1980 | Rogers et al. | 178/19 |
| 4,213,005 | 7/1980 | Cameron | 178/18 |
| 4,217,649 | 8/1980 | Doundoulakis | 178/19 |
| 4,831,216 | 5/1989 | Landmeier | 178/19 |
| 4,890,096 | 12/1989 | Taguchi et al. | 178/19 |
| 5,028,745 | 7/1991 | Yamanami | 178/19 |
| 5,070,217 | 12/1991 | Kobayashi | 178/18 |
| 5,220,324 | 6/1993 | Morita | 178/18 |

Primary Examiner—Stephen Chin
Assistant Examiner—Vijay Shankar
Attorney, Agent, or Firm—Ladas & Parry

[57] ABSTRACT

A method and apparatus for producing a digital number representing the location of a pointing instrument with respect to a plurality of spaced conductors is disclosed. The instrument has a coil unit which produces an alternating magnetic field for inducing a plurality of alternating current signals in the plurality of spaced conductors, respectively, when an alternating current electrical signal is applied thereto. The conductors are sampled in a predetermined order so as to sense the induced alternating current signals. A phase sensitive detector is employed to detect a phase reversal between the induced alternating current signals induced in ones of the conductors located on opposite sides of the coil to produce a signal waveform which changes polarity in response to the phase reversal. A position counter is then incremented at a predetermined rate upon detection of the phase reversal until sampling of a succeeding one of the conductors which immediately follows the detection of the phase reversal is to be initiated. A processor deducts a digital number in the position counter from a digital number corresponding to a predetermined distance of the succeeding one of the conductors from a marginal one of the conductors in order to determine the location of the pointing instrument.

5 Claims, 7 Drawing Sheets

METHOD AND APPARATUS FOR FINDING THE LOCATION OF A POINTING INSTRUMENT ON A TABLET

BACKGROUND OF THE INVENTION

1. Field of the Invention

The invention relates to a method and apparatus for finding the location of a pointing instrument on a tablet.

2. Description of the Related Art

U.S. Pat. No. 4,210,775 discloses a method and apparatus for producing an electrical signal which represents the location of a pen with respect to a grid of spaced conductors. The pen is provided with a coil for producing an alternating magnetic field in response to an alternating current electrical signal of a predetermined magnitude and frequency that is applied thereto, thereby inducing a plurality of alternating current signals in the spaced conductors. A sensing unit scans sequentially the spaced conductors in the X and Y directions. A position counter executes a counting operation while the sensing unit is performing a scanning operation. The sensing unit includes a differential amplifier circuit which is coupled sequentially to the spaced conductors so as to receive the respective alternating current signals in the spaced conductors. The output of the differential amplifier circuit is fed to a phase sensitive detector. When a phase reversal is detected on opposite sides of the pen, the operation of the position counter is stopped, and the output of the position counter is recorded. The recorded digital output of the position counter represents the location of the pen with respect to the grid of spaced conductors.

Figure 1A:
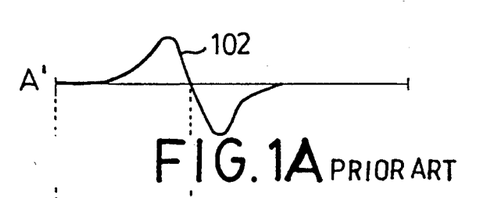
FIG. 1A illustrates a plot of the filtered output of a phase sensitive detector of the digitizing apparatus disclosed in U.S. Pat. No. 4,210,775.
Figure 1B:
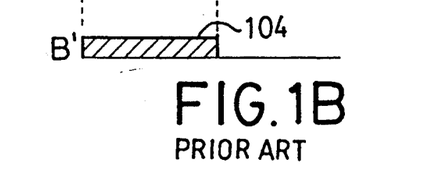
FIG. 1B illustrates a plot of the operating period of a position counter of the digitizing apparatus disclosed in U.S. Pat. No. 4,210,775 with respect to the plot of FIG. 1A.

It has been shown that in the conventional digitizing apparatus, the position counter is operated from the start of each counting operation until a phase reversal condition is detected. Referring to FIGS. 1A and 1B, plot (A') shows the filtered output of the phase sensitive detector 102, while plot (B') shows the operating period 104 of the position counter. From these drawings, the following drawbacks can be observed:

1. The operating period of the position counter is relatively long.
2. The size of the position counter should be relatively large so as to generate a precise output.
3. The size of the position counter should be increased correspondingly when the sample area is increased.

SUMMARY OF THE INVENTION

Therefore, the main objective of the present invention is to provide a method and apparatus for finding the location of a pointing instrument on a tablet, which method and apparatus employs a relatively small position counter while generating a precise output.

Another objective of the present invention is to provide a method and apparatus for finding the location of a pointing instrument on a tablet, which method and apparatus employs a relatively small position counter regardless of the size of the sample area.

According to the method and apparatus of the present invention, a coil unit is supported over a grid of spaced conductors that is embedded in a tablet by a pointing instrument. The coil unit produces an alternating magnetic field that induces a plurality of alternating current signals in the spaced conductors when a current signal of predetermined magnitude and frequency is applied thereto. A sampling circuit is provided to couple the conductors to an input of an amplifier in a predetermined order so as to sense the induced alternating current signals. A phase sensitive detector receives the amplified alternating current signals from the amplifier and produces an output signal of positive polarity corresponding to the alternating current signals induced in the spaced conductors located on one side of the coil unit and of negative polarity corresponding to the alternating current signals induced in the spaced conductors located on the other side of the coil unit. A filter is coupled to the phase sensitive detector and generates an envelope waveform from the output signal of the latter. A detector control unit detects a zero crossing of the envelope waveform and initiates the counting operation of a position counter upon detection of the zero crossing. The counting operation of the position counter is continued until sampling of an Nth one of the conductors which immediately follows the detection of the zero crossing is to be initiated. A processor receives a digital number from the position counter and deducts the latter from a digital number which corresponds to a predetermined distance of the Nth conductor from a marginal one of the conductors in order to produce the digital number that represents the location of the pointing instrument with respect to the tablet.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 2:
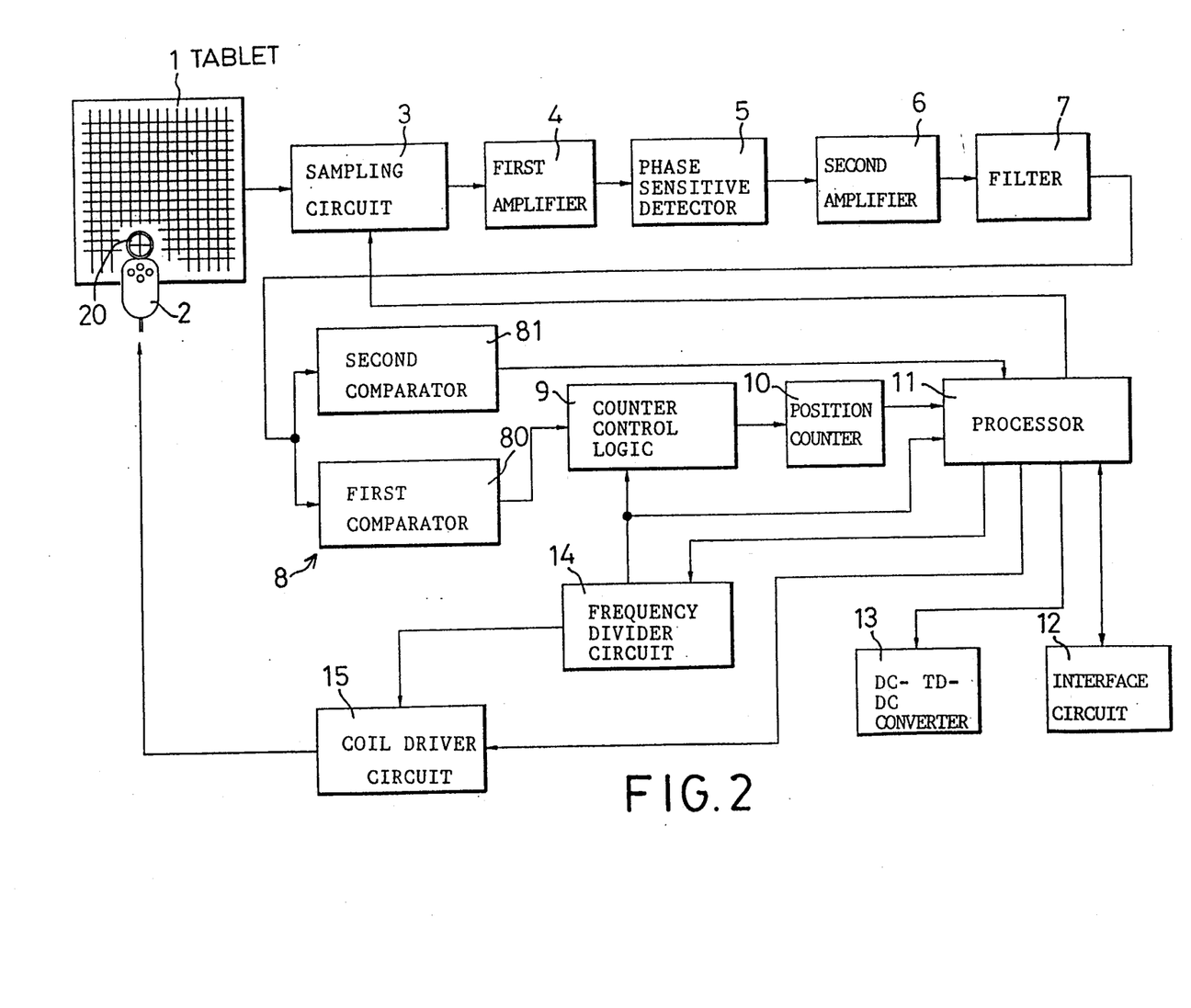
FIG. 2 is a schematic circuit block diagram of the preferred embodiment of an apparatus for finding the location of a pointing instrument on a tablet in accordance with the present invention.
Figure 3A:
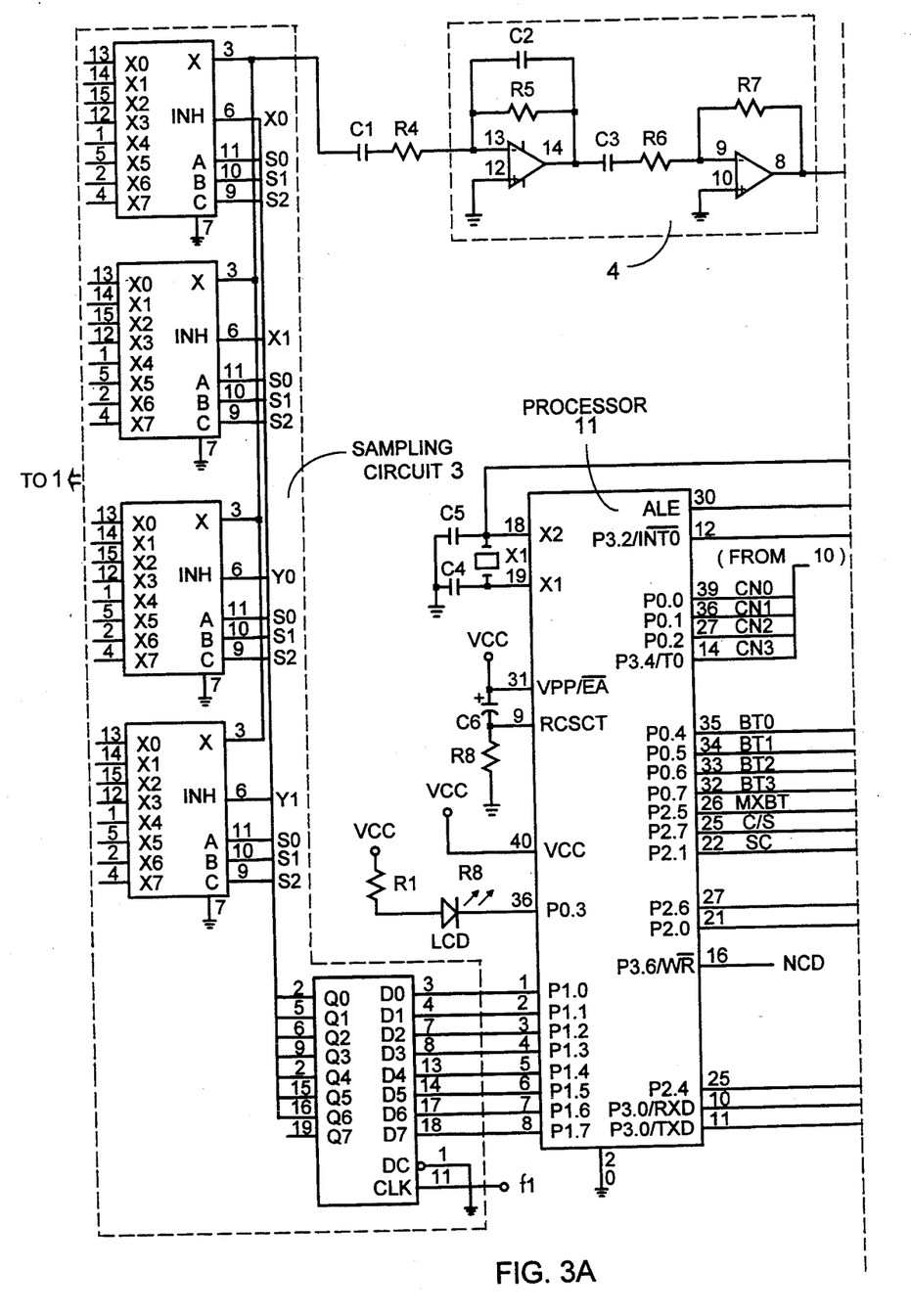
FIGS. 3A, 3B and 3C are schematic electrical circuit diagrams of the preferred embodiment.
Figure 3B:
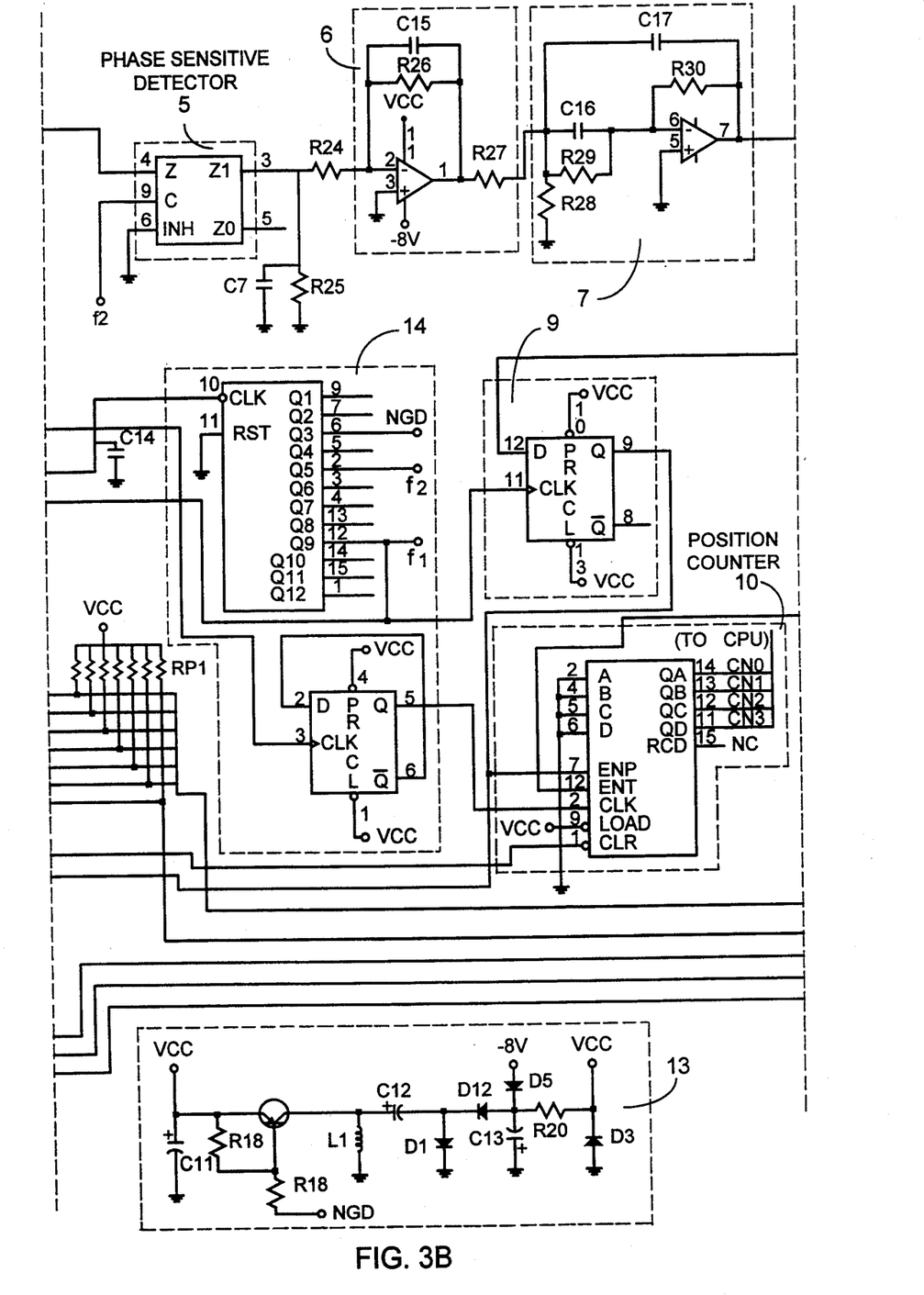
Figure 3C:
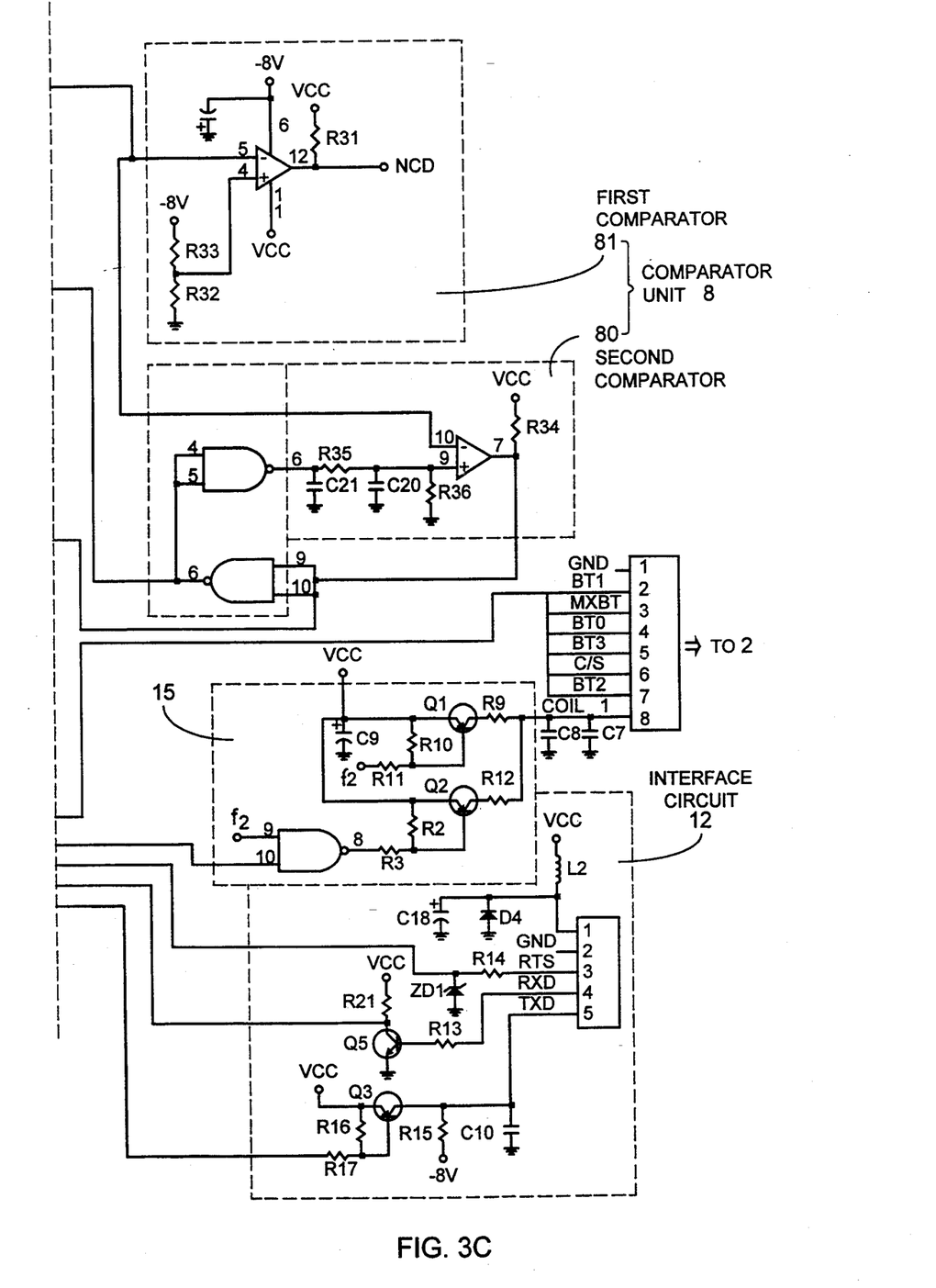
Figure 4:
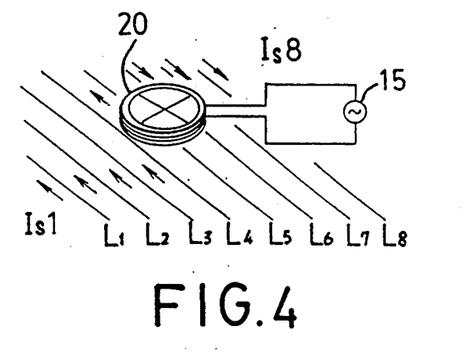
FIG. 4 illustrates how a coil unit which is supported on the pointing instrument induces current signals on spaced conductors that are embedded in the tablet.
Figure 5A:
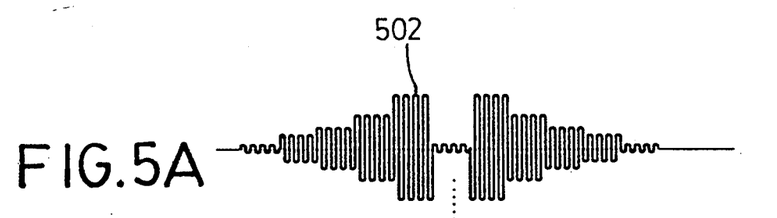
FIG. 5A shows a signal waveform produced by the first amplifier of FIGS. 2 and 3.
Figure 5B:
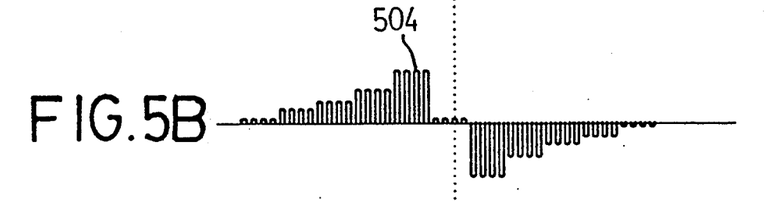
FIG. 5B shows a signal waveform produced by the phase reversal detector of FIGS. 2 and 3.

Referring to FIGS. 2 and 3, in order to accomplish the method of the present invention, the preferred embodiment of an apparatus for finding the location of a pointing instrument (2) on a tablet (1) is shown to comprise a sampling circuit (3), a first amplifier (4), a phase sensitive detector (5), a second amplifier (6), a filter (7), a detector control unit including a comparator unit (8) and a counter control logic (9), and a position counter (10). The processor (11) generates a sampling sequence control signal to the sampling circuit (3) and is connected to an interface circuit (12), a DC-to-DC converter (13) and to a frequency divider circuit (14). The interface circuit (12) is responsible for connecting the processor (11) with an external computer. The DC-to-DC converter (13) is responsible for supplying the required DC voltage to the various components of the apparatus of the present invention. The frequency divider circuit (14) receives a clock signal from the processor (11) and generates a sampling reference frequency signal (f1) and a coil driving frequency signal (f2). A coil driver circuit (15) receives the coil driving frequency signal (f2) and provides a current signal of a predetermined magnitude and frequency to the pointing instrument (2). The tablet (1) has a plurality of parallel spaced conductors oriented in the horizontal direction and a plurality of parallel spaced conductors oriented in the vertical direction embedded therein, thereby forming a grid of spaced conductors. A coil unit (20) is provided on the positioning instrument (2) and receives the current signal from the coil driver circuit (15) so as to produce an alternating magnetic field. Referring to FIG. 4, the alternating magnetic field induces a plurality of alternating current signals (Is1-Is8) in the spaced conductors (L1-L8). In the preferred embodiment, the processor (11) controls the sampling circuit (3) to couple the spaced conductors to an input of the first amplifier (4) in a predetermined sequential order, thereby obtaining the signal waveform 502 shown in FIG. 5A. The phase sensitive detector (5) receives the output of the first amplifier (4) and is used to detect a phase reversal in the latter. The phase sensitive detector (5) produces an output signal 504 of positive polarity corresponding to the alternating current signals induced in the spaced conductors located on one side of the coil unit (20) and of negative polarity corresponding to the alternating current signals induced in the spaced conductors located on the other side of the coil unit (20), as shown in FIG. 5B. The output of the phase sensitive detector (5) is amplified by the second amplifier (6) and is then filtered by the filter (7) in order to obtain an envelope waveform 506, as shown in FIG. 5C.

Figure 5C:
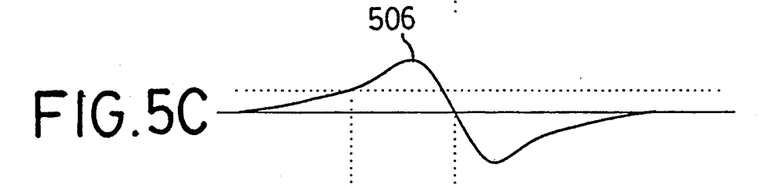
FIG. 5C shows a signal waveform produced by the filter of FIGS. 2 and 3.
Figure 5D:
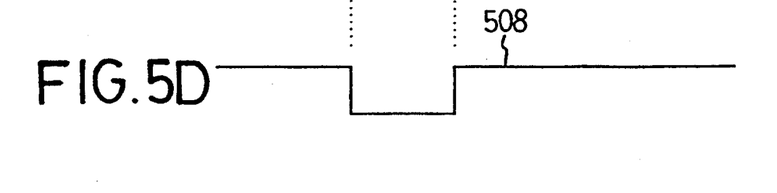
FIG. 5D shows a signal waveform produced by the first comparator of FIGS. 2 and 3.
Figure 5E:
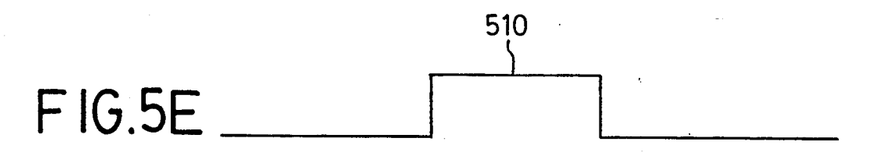
FIG. 5E shows the signal waveform of FIG. 5D after inversion.
Figure 5F:
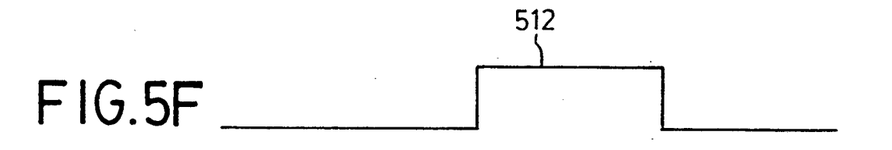
FIG. 5F shows a signal waveform produced by the counter control logic of FIGS. 2 and 3.
Figure 5G:
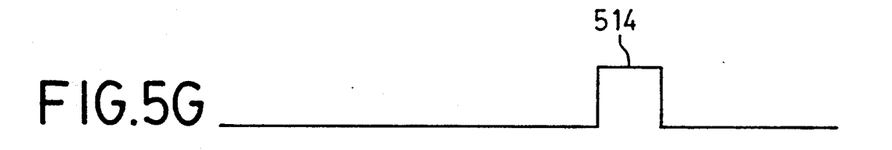
FIG. 5G illustrates the operating period of the position counter of FIGS. 2 and 3 with reference to the signal waveform of FIG. 5C.
Figure 5H:
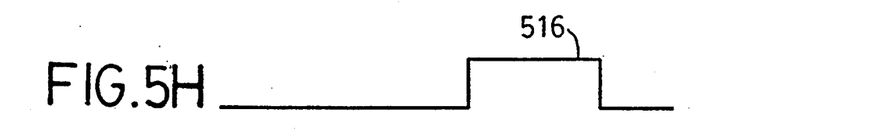
FIG. 5H shows a signal waveform produced by the second comparator of FIGS. 2 and 3.
Figure 5I:
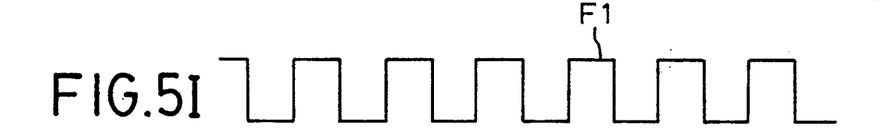
FIG. 5I shows a sampling reference frequency signal that is generated by the frequency divider of FIGS. 2 and 3.

In order to detect the zero crossing of the envelope waveform shown in FIG. 5C, first and second comparators (80, 81) of the comparator unit (8) of the detector control unit compare the envelope waveform with predetermined reference voltages. The first comparator (80) compares the envelope waveform with a positive reference voltage. When the voltage of the envelope waveform becomes greater than the positive reference voltage, the output 508 of the first comparator (80) transits to a low logic state, as shown in FIG. 5D. The output of the first comparator (80) transits to a high logic state when the voltage of the envelope waveform is approximately zero. The output of the first comparator (80) is inverted by an inverter (82). The counter control logic (9) receives the inverted output 510 of the first comparator (80), as shown in FIG. 5E. The counter control logic (9) serves to synchronize the inverted output of the first comparator (80) with the sampling reference frequency signal (f1). The sampling reference frequency signal (f1) is shown in FIG. 5I, while the output 512 of the counter control logic (9) is shown in FIG. 5F. The output of the second comparator 516 (81) transits to a high logic state when the voltage of the envelope waveform becomes negative in polarity, as shown in FIG. 5H. The output of the second comparator (81) is received by the processor (11) to indicate the end of the sampling operation. Thus, an idle sampling operation is ongoing as long as the processor (11) does not receive an output signal from the second comparator (81). Therefore, the output of the second comparator (81) is used to verify proper operation of the apparatus.

Figure 6:
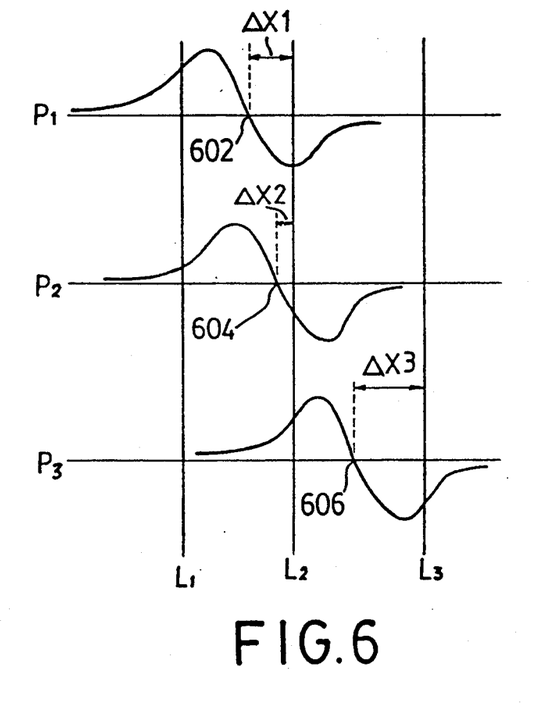
FIG. 6 shows three different waveforms produced by the filter of FIGS. 2 and 3 and the corresponding count output of the position counter.

The output of the counter control logic (9) is received by the position counter (10) at a first enable control pin (ENP) of the latter. The output of the first comparator (80) is received by the position counter (10) at a second enable control pin (ENT) of the latter. The position counter (10) is incremented at a predetermined rate only when both first and second enable control pins (ENP, ENT) have a high logic input thereto, as shown by 514 in FIG. 5G. Thus, the operating period of the position counter (10) starts from the time when phase reversal or the zero crossing of the envelope waveform is detected and ends at the start of a succeeding pulse of the sampling reference frequency signal (f1). Note that each of the pulses of the sampling reference frequency signal (f1) corresponds to one of the spaced conductors embedded in the tablet (1). Thus, the pulse which immediately follows the detection of the zero crossing of the envelope waveform corresponds to an Nth conductor which immediately follows the detection of the zero crossing. The processor (11) receives a digital number in the position counter (10) and deducts the latter from a digital number which corresponds to a predetermined distance of the Nth conductor from a marginal one of the conductors in order to produce the digital number representing the location of the pointing instrument (2) on the tablet (1). For example, referring to FIG. 6, the location 602 of the pointing instrument on the horizontal axis (P1) is equal to L2 $-\Delta X1$. The location 604 of the pointing instrument on the horizontal axis (P2) is equal to L2 $-\Delta X2$, while the location 606 of the pointing instrument on the horizontal axis (P3) is equal to L3 $-\Delta X3$.

Figure 7:
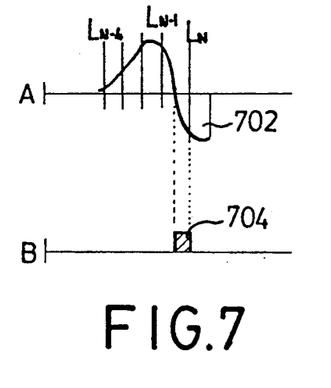
FIG. 7 illustrates the operating period of the position counter with respect to a signal waveform from the filter of FIGS. 2 and 3.

The advantages and characterizing features of the present invention are as follows:

1. Unlike the conventional digitizing apparatus disclosed in U.S. Pat. No. 4,210,775, the operating period of the position counter (10) is relatively short. Referring to FIG. 7, plot (A) shows the filtered output 702 of the phase sensitive detector, while plot (B) shows the operating period 704 of the position counter (10). The operating period of the position counter (10) starts from the time (T) when the zero crossing of the envelope waveform is detected and ends when sampling of the Nth conductor which immediately follows the detection of the zero crossing is to be initiated. The maximum operating period of the position counter (10) thus corresponds to the distance between two adjacent conductors.

2. The size of the position counter (10) is kept small while maintaining a precise output.

3. The size of the position counter is kept small regardless of the size of the sample area.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An apparatus for producing a digital number representing the location of a pointing instrument with respect to a plurality of spaced conductors, said apparatus comprising:

a processor means for providing a clock output;

a frequency divider means for receiving and dividing said clock output so as to generate a sampling reference frequency signal and a coil driving frequency signal, each pulse of said sampling reference frequency signal corresponding to one of said spaced conductors;

a coil driver circuit means for receiving said coil driving frequency signal and for producing a current signal of predetermined magnitude and frequency;

a coil means supported over said spaced conductors by said pointing instrument, said coil means producing an alternating magnetic field in response to said current signal so as to induce a plurality of alternating current signals in said spaced conductors;

an amplifier means for amplifying said induced alternating current signals;

a sampling circuit means for receiving said sampling reference frequency signal and being controlled by said processor means so as to couple said spaced conductors to an input of said amplifier means in a predetermined order;

a phase sensitive detector means for receiving said amplified alternating current signals from said amplifier means, said phase sensitive detector means for detecting a phase reversal between said induced alternating current signals induced in ones of said spaced conductors located on opposite sides of said coil means to produce a signal waveform which changes polarity in response to the phase reversal;

a filter means responsive to said phase sensitive detector means for filtering said signal waveform so as to generate an envelope waveform;

a comparator unit responsive to said filter means and including a first comparator for comparing said envelope waveform with a positive reference voltage, said first comparator having an output which transits to a low logic state when a voltage of said envelope waveform exceeds said positive reference voltage and which transits to a high logic state when the voltage of said envelope waveform is approximately zero;

an inverter means responsive to said first comparator for inverting said output of said first comparator;

a counter control logic means for receiving said inverted output from said inverter means and said sampling reference frequency signal from said frequency divider means, said counter control logic means synchronizing said inverted output with said sampling reference frequency signal; and a position counter having first and second enable pins respectively receiving said output of said first comparator and said synchronized inverted output from said counter control logic means, said position counter being incremented at a predetermined rate when both said output of said first comparator and said synchronized inverted output from said counter control logic means are at a high logic state;

both said output of said first comparator and said synchronized inverted output from said counter control logic means being at the high logic state during a counter operating period starting from detection of the phase reversal until sampling of a succeeding one of said spaced conductors which immediately follows the detection of the phase reversal is to be initiated;

said processor means deducting a digital number in said position counter from a digital number corresponding to a predetermined distance of said succeeding one of said spaced conductors from a marginal one of said spaced conductors in order to produce the digital number representing the location of said pointing instrument with respect to said plurality of spaced conductors.

2. The apparatus as claimed in claim 1, further comprising an interface circuit means for connecting said processor means to an external computer.

3. The apparatus as claimed in claim 1, further comprising a second comparator having an output which transits to a high logic state when the voltage of said envelope waveform becomes negative, said output of said second comparator being received by said processor means to verify proper operation of said apparatus.

4. A method for producing a digital number representing the location of a pointing instrument with respect to a plurality of spaced conductors, said pointing instrument including a coil unit for producing an alternating magnetic field in response to an alternating current electrical signal, comprising the steps of:

(a) applying a current signal of predetermined magnitude and frequency to said coil unit to induce a plurality of alternating current signals in said plurality of spaced conductors, respectively;

(b) sampling said spaced conductors in a predetermined order so as to sense said induced alternating current signals;

(c) detecting a phase reversal between said induced alternating current signals induced in ones of said spaced conductors located on opposite sides of said coil unit to produce a signal waveform which changes polarity in response to the phase reversal;

(d) incrementing a position counter at a predetermined rate upon detection of the phase reversal until sampling of a succeeding one of said spaced conductors which immediately follows the detection of said phase reversal is to be initiated; and (e) providing a processor unit which deducts a digital number in said position counter from a digital number corresponding to a predetermined distance of said succeeding one of said spaced conductors from a marginal one of said spaced conductors in order to produce the digital number representing the location of said pointing instrument with respect to said plurality of spaced conductors.

5. (Amended) The method as claimed in claim 4, wherein said sampling step includes the step of providing a sampling circuit which is controlled by said processor unit so as to couple sequentially said spaced conductors to an input of an amplifier.

* * * * *